United States Patent
Fetty et al.

(10) Patent No.: US 8,360,651 B1
(45) Date of Patent: Jan. 29, 2013

(54) ROLLER BEARING SEAL

(75) Inventors: Mark W Fetty, Chesterfield, VA (US);
Michael A Mason, Richmond, VA (US);
Paul A Hubbard, Petersburg, VA (US)

(73) Assignee: Amsted Rail Company, Inc., Chicago, IL (US)

( * ) Notice: Subject to any disclaimer, the term of this patent is extended or adjusted under 35 U.S.C. 154(b) by 0 days.

(21) Appl. No.: 13/200,236

(22) Filed: Sep. 22, 2011

(51) Int. Cl.
*F16C 33/80* (2006.01)
(52) U.S. Cl. .......................................... 384/481; 384/459
(58) Field of Classification Search .................. 384/459, 384/477, 478, 480; 277/347, 423, 418
See application file for complete search history.

(56) References Cited

U.S. PATENT DOCUMENTS

| | | | | |
|---|---|---|---|---|
| 1,978,739 A | * | 10/1934 | Brittain, Jr. | .................... 277/420 |
| 3,482,844 A | * | 12/1969 | McKinven, Jr. | ............... 277/349 |
| 3,741,614 A | * | 6/1973 | Judge | ............................. 384/459 |
| 3,833,277 A | * | 9/1974 | Jones et al. | .................... 384/459 |
| 4,438,990 A | * | 3/1984 | Schalk et al. | ................. 384/480 |
| 4,819,949 A | * | 4/1989 | Otto | ................................ 277/351 |
| 5,975,533 A | * | 11/1999 | Hubbard et al. | ............... 277/351 |
| 6,126,321 A | * | 10/2000 | Fetty et al. | .................... 384/459 |
| 6,845,986 B2 | * | 1/2005 | Hood et al. | .................... 277/409 |
| 7,607,836 B2 | * | 10/2009 | Mason et al. | ................. 384/480 |
| 2009/0127795 A1 | * | 5/2009 | Lattime et al. | ................. 277/412 |

* cited by examiner

*Primary Examiner* — Thomas R Hannon
(74) *Attorney, Agent, or Firm* — Edward J. Brosius

(57) ABSTRACT

A bearing assembly is provided having a roller bearing with an inner raceway fitted around the journal portion of an axle. An outer raceway combines with the inner raceway to receive roller elements. A backing ring is centered to the shaft fillet. An annular wear ring is positioned between the inner race and the backing ring. An improved lubricant seal arrangement is provided between the wear ring and the supporting outer raceway, and includes a rotor, a seal, a slinger and, in some embodiments, a stator.

10 Claims, 3 Drawing Sheets

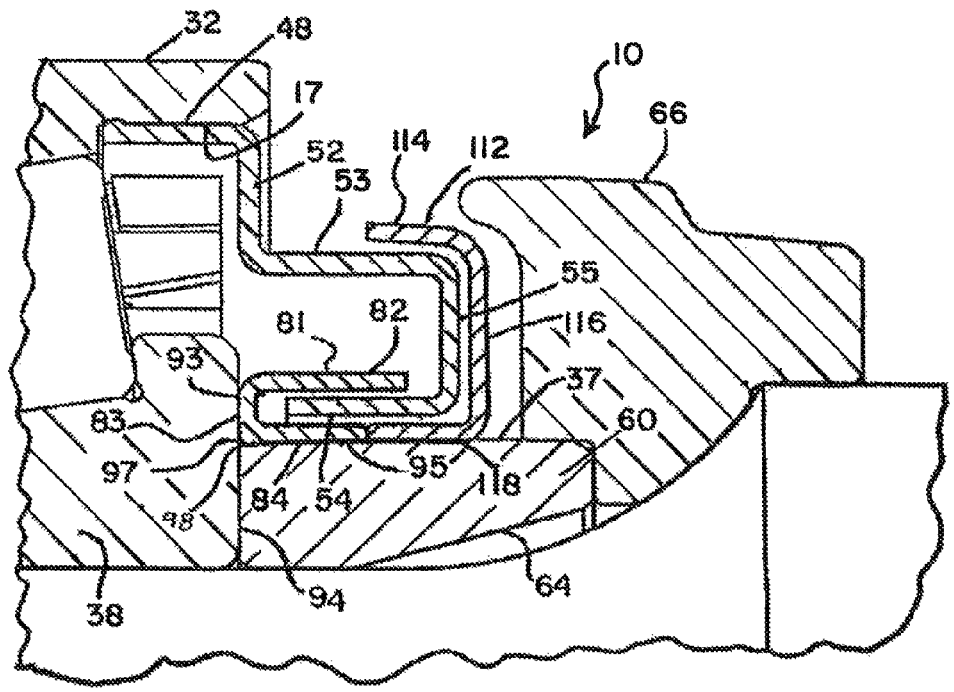

ROLLER BEARING SEAL

BACKGROUND OF THE INVENTION

This invention relates to sealed shaft journal bearings and, more particularly, to an improved tapered roller bearing assembly seal arrangement.

Roller bearing assemblies incorporating two rows of tapered roller bearings preassembled into a self-contained, pre-lubricated package for assembly onto journals at the ends of axles or shafts are known. Such bearing assemblies are used as rail car bearings assembled onto journals at the ends of the car axles. Bearings of this type typically employ two rows of tapered roller bearings fitted one into each end of a common bearing cup with their respective bearing cones having an inner diameter dimensioned to provide an interference fit with the shaft journal and with a cylindrical sleeve or spacer positioned between the cones providing accurate spacing and proper lateral clearance on the journal. Seals mounted within each end of the bearing cup provide sealing contact with wear rings bearing against the outer ends or back face of the respective bearing cones at each end of the assembly. Such seals are shown in U.S. Pat. Nos. 5,975,533 and 7,607,836.

In a typical rail car installation, the axle journal is machined with a fillet at the inboard end, and a backing ring having a surface complementary to the contour of the fillet and an abutment surface for engaging the inboard end of the inner wear ring accurately positions the bearing assembly on the journal. An end cap mounted on the end of the axle by bolts threaded into bores in the end of the axle engages the outboard wear ring and clamps the entire assembly on the end of the axle. The wear rings typically have an inner diameter dimensioned to provide an interference fit with the journal over at least a portion of their length so that the entire assembly is pressed as a unit onto the end of the journal shaft.

SUMMARY OF THE INVENTION

The bearing assembly of the present invention is a roller bearing that includes an inner race or cone fitted around the journal portion of the axle or shaft. The inner race includes an outwardly directed raceway. An outer race or cup has an inwardly directed raceway. Roller elements are located between and contacting the inner and outer raceways.

A backing ring has a contoured surface complementary to and engaging the contoured surface of a fillet formed on the shaft. The fillet leads from the journal to the shoulder of the shaft. The contoured surfaces cooperate to fix the backing ring against axial movement along the shaft.

The bearing assembly includes a seal assembly that provides a barrier for lubricant to be retained within the seal assembly and for contaminants to be kept out. The seal assembly may include a stator adjacent to the seal section itself and a rotor adjacent to a wear ring. A slinger having a section adjacent the wear ring is also provided. The inter-related relationship between the seal section, stator, rotor and slinger act to retain the lubricant within the seal assembly and to keep contaminants out.

BRIEF DESCRIPTION OF THE DRAWINGS

In the drawings,

FIG. 2 is a detailed partial view in cross section of a tapered roller bearing seal assembly in accordance with a first embodiment of the present invention;

FIG. 3 is a detailed view in partial cross section of a tapered roller bearing assembly in accordance with a second embodiment of the present invention.

DESCRIPTION OF THE PREFERRED EMBODIMENTS

Figure 1:
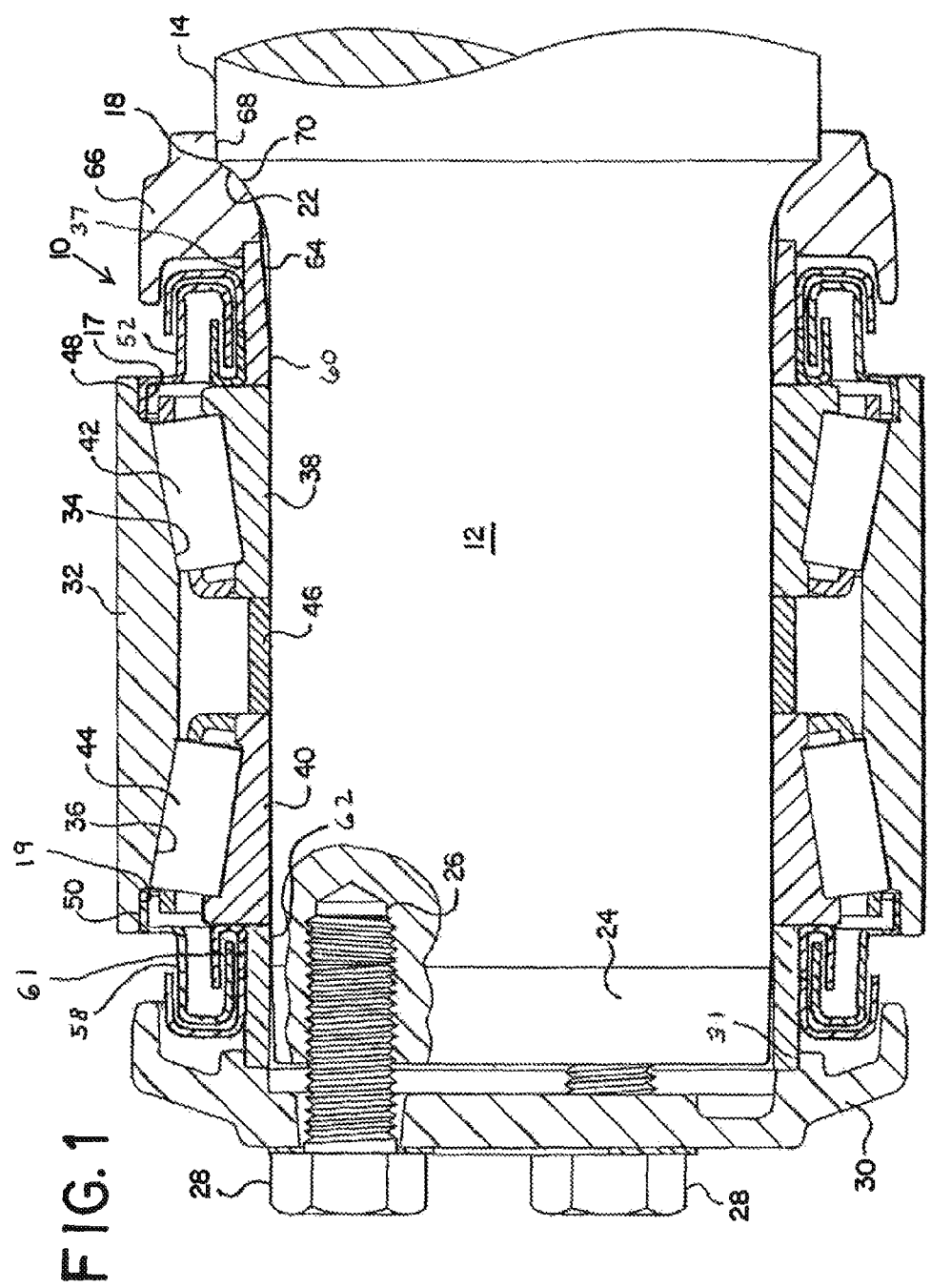
FIG. 1 is a sectional view of a shaft journal having mounted thereon a tapered roller bearing assembly in accordance with an embodiment of the present invention.

Referring now to FIG. 1 of the drawings, a bearing assembly indicated generally by the reference numeral 10 on FIG. 1 is shown mounted on a journal 12 on the free, cantilevered end of a shaft or axle 14, typically a rail car axle. Journal 12 is machined to very close tolerances and terminates at its inner end in a contoured fillet 22 leading to a cylindrical shoulder 18 of axle 14. At the free end of the axle, journal portion 12 terminates in a slightly conical or tapered guide portion 24 dimensioned to facilitate installation of the bearing assembly onto the journal. A plurality of threaded bores 26 are formed in the end of axle 14 for receiving threaded cap screws, or bolts 28 for mounting a bearing retaining cap 30 on the end of the shaft to clamp the bearing in position as described more fully herein below.

The bearing assembly 10 is preassembled before being mounted and clamped on journal 12 by cap 30 and bolts 28. The bearing assembly includes a unitary bearing cup or outer raceway 32 having a pair of raceways 34, 36 formed one adjacent each end thereof which cooperate with a pair of bearing cones 38, 40, respectively, to support the two rows of tapered rollers 42, 44, respectively, therebetween. A center spacer 46 is positioned between cones 38, 40 to maintain the cones in accurately spaced position relative to one another allowing for proper bearing lateral clearance.

The bearing cup 32 is provided with cylindrical counterbores 17,19 at its opposite ends outward of the raceways 34, 36, and a pair of seal sections 52, 58 are pressed one into each of the cylindrical counterbores 17,19 in cup 32. Each seal section 52, 58 includes resilient sealing elements which rub upon and form a seal with surfaces 37,61 of a pair of seal wear rings 60, 62, having an inwardly directed end in engagement with the outwardly directed ends of bearing cones 38, 40, respectively. Seal section 58 is similar to seal section 52 and will not be described in detail. The other end of wear ring 60 is received in a cylindrical counterbore 64 in the axially outwardly directed end of an annular backing ring 66 which, in turn, has a counterbore 68 at its other end which is dimensioned to be received in interference relation on the cylindrical shoulder 18 of shaft 14. The counterbore 64 and the outer diameter of wear ring 60 are also dimensioned to provide an interference fit so that wear ring 60 is pressed into the backing ring 66 which is accurately machined to provide a contoured inner surface 70 complementary to and engaging the contour of fillet 22 when the bearing is mounted on the shaft. The outwardly directed end of wear ring 62 bears against a counterbore 31 in retaining cap 30.

Referring now to FIG. 2, a detailed view of seal assembly portion of bearing assembly 10 is provided. Seal section 52 is seen to comprise a generally cylindrical piece, having a larger diameter first end section 48 pressed or fit into a complementary counterbore 17 in cup 32. Seal section 52 includes an intermediate section 53 that extends parallel to first end section 48, and a second end section 54 extending from intermediate section 53 and parallel to first end section 48. Portion 55 of intermediate section 53 is normal to intermediate section 53.

Rotor 81 is seen to be a generally cylindrical piece having an outer section 82 of a larger diameter. Intermediate section 83 extends from outer section 82 and is generally normal thereto. Intermediate section 83 includes a generally flat outer section 93 that is fitted against a complementary flat surface 94 of bearing cone 38. Inner section 84 of rotor 81 extends from intermediate section 83 and is generally normal thereto. Inner section 84 of rotor 81 has an outer surface 95 which is fitted against outer surface 37 of wear ring 60. Slinger 112 is a generally cylindrical structure usually comprised of steel or a polymer plastic. Slinger 112 includes a first end section 114, an intermediate section 116 normal to first end section 114 and a second end section 118 normal to intermediate section 116. First end section 114 is of a greater diameter than second end section 118. First end section 114 is located adjacent to and radially outside of intermediate section 53 of seal 52. Intermediate section 116 is located adjacent and radially inside of seal portion 55. Second end section 118 includes an outer surface that is adjacent to and abutting against outer surface 37 of wear ring 60.

Outer surface 95 of rotor inner section 84 is welded, glued, or interference fitted to outer surface 37 of wear ring 60. A bead or rib 97 or other affixing media can be located at inner section 84 of rotor 81 to affix to outer surface 37 of wear ring 60. Chamfer 98 in outer surface 37 of wear ring 60 aids the bead or rib 97 with relation to outer surface 37. The combination and configuration of seal section 52, slinger 112, rotor 81 assist in retaining lubricant within the seal assembly. As rotor 81, inner section 84, and outer section 82 rotate about seal second end section 54, the path required for lubricant to escape from within the seal assembly is torturous. Preferably, seal second end section 54 extends a minimum of about halfway into the channel formed by rotor outer section 82 and inner section 84, but such extension could be from 25% to 75% or more. It should be understood that seal 52 itself is normally comprised of a suitable steel, as are rotor 81, stator 47 and slinger 112. However, it is within the scope of the present invention to have one or more of seal 52, rotor 81 or slinger 112 comprised of an engineered plastic polymer or thermoplastic such as a polyester or composite material.

Referring now to FIG. 3. a detailed view of a second embodiment of a seal assembly portion of bearing assembly 110 is provided. Seal section 152 is seen to comprise a generally cylindrical piece, having first end section 148 pressed or fit into a complementary counterbore 117 in cup 132. Seal section 152 includes an intermediate section 153 that extends normal to first end section 148, and second end section 155 has a smaller diameter than first end section 148, and is parallel therewith.

A stator 147 is a generally cylindrical piece, having a first end section 149 having an outer surface 159 adjacent and affixed to an inner surface 157 of second end section 155 of seal 152. Stator 147 also includes intermediate section 161 that is normal to first end section 149 and a second end section 151 that is normal to intermediate section 161.

Rotor 181 is seen to be a generally cylindrical piece having an outer section 182 of a larger diameter. Intermediate section 183 extends from outer section 182 and is generally normal thereto. Intermediate section 183 includes a generally flat outer section 193 that is fitted against a complementary flat surface 194 of bearing cone 138. Inner section 184 of rotor 181 extends from intermediate section 183 and is generally normal thereto. Inner section 184 of rotor 181 has an outer surface 195 which is fitted against outer surface 137 of wear ring 160.

Outer surface 195 of rotor 181 is welded, glued, or interference fitted to outer surface 137 of wear ring 160. A bead or rib 197 or other affixing media can be located at a corner between intermediate section 183 of rotor 181 and outer surface 195 of inner section 184 of rotor 181 to affix to outer surface 137 of wear ring 160. Chamfer 198 in outer surface 137 of wear ring 160 aids the bead or rib 197 with location to outer surface 137.

Slinger 212 is a generally cylindrical structure usually comprised of steel or a polymer plastic. Slinger 212 includes a first end section 214, an intermediate section 216 normal to first end section 214 and a second end section 218 normal to intermediate section 216. First end section 214 of a greater diameter than second end section 218 and is located adjacent to and radially outside second end section 155 of seal 152. Intermediate section 216 is located adjacent and radially inside of stator intermediate section 161. Second end section 218 includes an outer surface that is adjacent to and abutting against outer surface 137 of wear ring 160.

The combination and configuration of seal section 152, including stator section 147 slinger 212 and rotor 181 assist in retaining lubricant within the seal assembly. As rotor 181 inner section 184 and outer section 182 rotate about stator 147 second end section 151, the path required for lubricant to escape from within the seal assembly is torturous. Preferably, stator 147 second end section 151 extends about halfway into the channel formed by rotor outer section 182 and inner section 184, but such extension could be from 25% to 75% or more. It should be understood that seal case 152 itself is normally comprised of suitable steel, as are rotor 181, stator 147 and slinger 212. However, it is within the scope of the present invention to have one or more of seal section 152, rotor 181, stator 147 and slinger 212 comprised of an engineered thermoplastic such as polyester or composite material.

Figure 4:
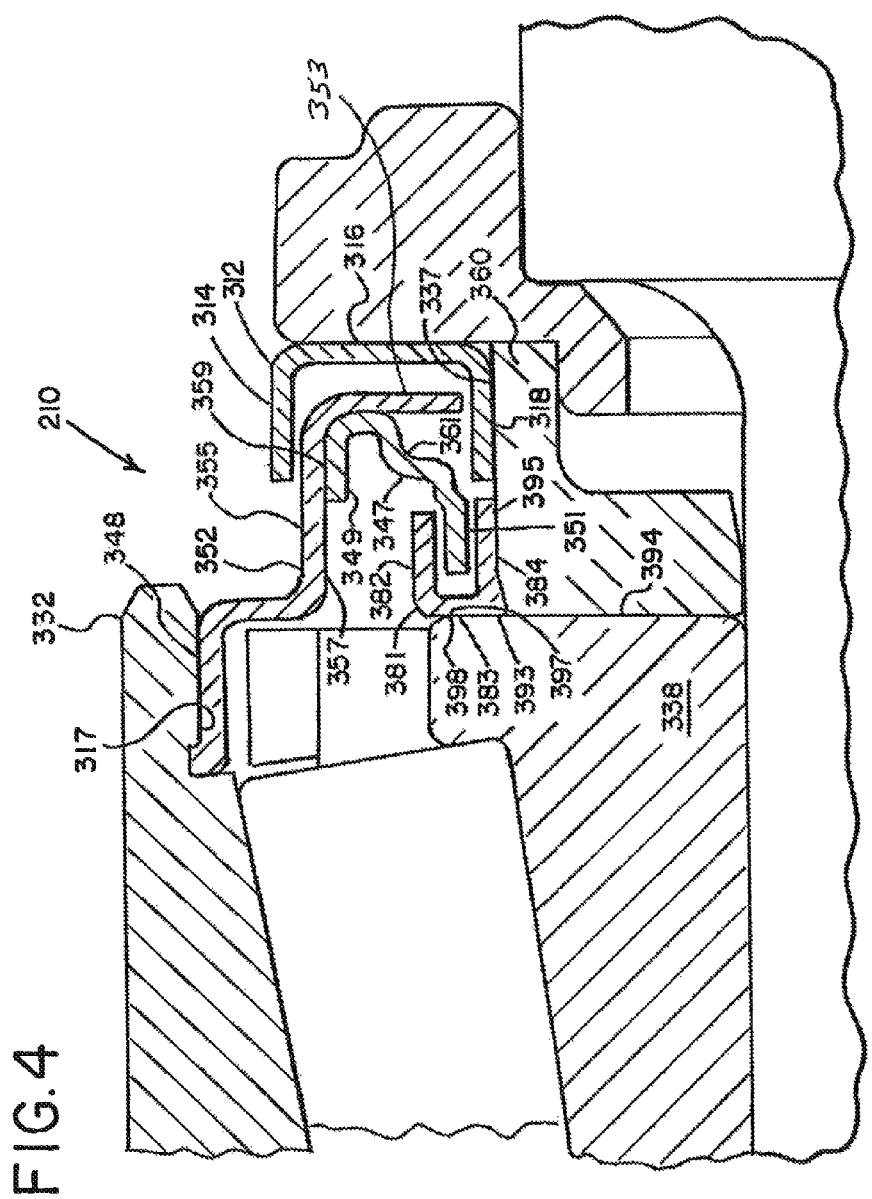
FIG. 4 is a detailed view in partial cross section of a tapered roller bearing assembly in accordance with a third embodiment of the present invention.

Referring now to FIG. 4 a detailed view of a third embodiment of a seal assembly portion of bearing assembly 210 is provided. Seal section 352 is seen to comprise a generally cylindrical piece, having first end section 348 pressed or fit into a complementary counterbore 317 in cup 332. Seal section 352 includes an intermediate section 355 that extends normal to first end section 348, and second end section 353 has a smaller diameter than first end section 348, and is parallel there with.

A stator 347 is a generally cylindrical piece, having a first end section 349 having an outer surface 359 adjacent and affixed to an inner surface 357 of second end section 353 of seal 352. Stator 347 also includes intermediate section 361 that extend from first end section 349 and a second end section 351 that extends from intermediate section 361.

Rotor 381 is seen to be a generally cylindrical piece having an outer section 382 of a larger diameter. Intermediate section 383 extends from outer section 382 and is generally normal thereto. Intermediate section 383 includes a generally flat outer section 393 that is fitted against a complementary flat surface 394 of bearing cone 338. Inner section 384 of rotor 381 extends from intermediate section 383 and is generally normal thereto. Inner section 384 of rotor 381 has an outer surface 395 which is fitted against outer surface 337 of wear ring 360.

Outer surface 395 of rotor 381 is welded, glued, or interference fitted to outer surface 337 of wear ring 360. A bead or rib 397 or other affixing media can be located at a corner between intermediate section 383 of rotor 381 and outer surface 395 of inner section 384 of rotor 381 to affix to outer surface 337 of wear ring 360. Chamfer 398 in outer surface 337 of wear ring 360 aids the bead or rib 397 with location to outer surface 337.

Slinger 312 is a generally cylindrical structure usually comprised of steel or polymer plastic. Slinger 312 includes a first end section 314, an intermediate section 316 normal to first end section 314 and a second end section 318 normal to intermediate section 316. First end section 314 of a greater diameter than second end section 318 and is located adjacent to and radially outside intermediate section 355 of seal 352. Intermediate section 316 is located adjacent and laterally inside of seal second end section 353. Second end section 318 includes an outer surface that is adjacent to and abutting against outer surface 337 of wear ring 360.

The combination and configuration of seal section 352, including stator section 347, slinger 312 and rotor 381 assist in retaining lubricant within the seal assembly. As rotor 381, inner section 384, and outer section 382 rotate about stator 347 second end section 351, the path required for lubricant to escape from within the seal assembly is torturous. Preferably, stator 347 second end section 331 extends about halfway into the channel formed by rotor outer section 382 and inner section 384, but such extension could be from 25% to 75% or more. It should be understood that seal case 352 itself is normally comprised of suitable steel, as are rotor 381, stator 347 and slinger 312. However, it is within the scope of the present invention to have one or more of seal section 352, rotor 381, stator 347 and sling 312 comprised of an engineered thermoplastic such as polyester or composite material.

What is claimed is:

1. A bearing assembly comprising:
a bearing cone including an outwardly directed raceway,
a bearing cup including a tapered inward directed raceway located in radially outwardly spaced relation to the bearing cone raceway, and rolling elements located between the inner and outer raceways,
the bearing cup having an inwardly facing cylindrical counterbore,
a wear ring having a cylindrical outer surface,
a seal having a first end portion received in interference relation within the cylindrical counterbore in the bearing cup and a second end portion,
a rotor element of a generally cylindrical shape, the rotor element comprising an outer section, a intermediate section and an inner section,
and a stator element of a generally cylindrical shape, the stator element comprising an outer section, an intermediate section and an inner section,
the outer section of the stator element having an outer surface adjacent the second end section of the seal,
the inner section of the stator element extending between the outer section and the inner section of the rotor element,
and a slinger element of a generally cylindrical shape, the slinger element comprising an outer section and an inner section, the inner section of the slinger element having an outer surface adjacent to the cylindrical outer surface of the wear ring, and the outer section of the slinger element radially outward and adjacent to the second end portion of the seal.

2. The roller bearing assembly of claim 1
wherein the rotor element intermediate section is generally normal to the outer section of the rotor and to the inner of the rotor section to form a channel shaped structure,
and wherein the second end section of the stator element extends into the channel shaped structure.

3. The roller bearing assembly of claim 1
wherein the intermediate section of the slinger extends adjacent to the intermediate section of the stator element.

4. A roller bearing assembly comprising
a cone having an outwardly directed raceway thereon,
a cup having an inwardly directed raceway thereon,
the cup having a generally flat, radially outward face,
the cup having an inwardly facing cylindrical counterbore,
a wear ring adjacent the cone, the wear ring having a cylindrical outer surface,
a seal having a generally cylindrical configuration, the seal including a first end section received in the inwardly facing cylindrical counterbore of the cup,
the seal having an intermediate section and a second end section,
a rotor of generally cylindrical shape, the rotor comprising an outer section, an intermediate section and an inner section,
the inner section of the rotor having an outer surface adjacent to the cylindrical outer surface of the wear ring,
and a stator of a generally cylindrical shape,
the stator having a first end section adjacent the intermediate section of the seal,
the stator having a second end section extending between the outer section and the inner section of the rotor,
and comprising a slinger of a generally cylindrical shape, the slinger element comprising an inner section having an outer surface adjacent the cylindrical outer surface of the wear ring.

5. The roller bearing assembly of claim 4
wherein the rotor element intermediate section is generally normal to the outer section of the rotor and to the inner section of the rotor to form a channel shaped structure,
and wherein the intermediate section of the rotor element has a generally flat outer surface that abuts the generally flat, radially outward face of the cone.

6. The roller bearing assembly of claim 4
wherein the slinger comprises an intermediate section and a second end section,
and wherein the second end section is adjacent the intermediate section of the seal.

7. The roller bearing assembly of claim 4
further comprising a backing ring of a generally cylindrical configuration having a generally flat lateral surface, and wherein the slinger comprises an intermediate section that is adjacent the lateral surface of the backing ring.

8. The roller bearing assembly of claim 4
wherein the rotor is comprised of a polymer material.

9. The roller bearing assembly of claim 4
wherein the stinger is comprised of a steel material or a polymer plastic material.

10. The roller bearing assembly of claim 4
wherein the stator is comprised of a polymer plastic material.

\* \* \* \* \*